(12) United States Patent
Kim

(10) Patent No.: US 10,654,457 B2
(45) Date of Patent: May 19, 2020

(54) ELECTRIC BRAKE SYSTEM AND METHOD FOR CONTROLLING THE SAME

(71) Applicant: MANDO CORPORATION, Gyeonggi-do (KR)

(72) Inventor: Young-Jae Kim, Gyeonggi-do (KR)

(73) Assignee: MANDO CORPORATION, Gyeonggi-Do (KR)

( * ) Notice: Subject to any disclaimer, the term of this patent is extended or adjusted under 35 U.S.C. 154(b) by 0 days.

(21) Appl. No.: 15/960,521

(22) Filed: Apr. 23, 2018

(65) Prior Publication Data

US 2018/0304872 A1 Oct. 25, 2018

(30) Foreign Application Priority Data

Apr. 24, 2017 (KR) ........................ 10-2017-0052327

(51) Int. Cl.
*B60T 8/32* (2006.01)
*B60T 8/40* (2006.01)
(Continued)

(52) U.S. Cl.
CPC ............ *B60T 8/3275* (2013.01); *B60T 7/042* (2013.01); *B60T 8/172* (2013.01); *B60T 8/175* (2013.01); *B60T 8/176* (2013.01); *B60T 8/1755* (2013.01); *B60T 8/4072* (2013.01); *B60T 8/4081* (2013.01); *B60T 8/4827* (2013.01); *B60T 13/62* (2013.01); *B60T 13/662* (2013.01); *B60T 13/745* (2013.01); *B60T 2220/04* (2013.01); *B60T 2270/10* (2013.01); *B60T 2270/20* (2013.01); *B60T 2270/304* (2013.01); *B60T 2270/82* (2013.01)

(58) Field of Classification Search
CPC ........ B60T 8/3275; B60T 8/172; B60T 8/175; B60T 8/176; B60T 8/4072; B60T 8/4827; B60T 8/1755; B60T 13/62; B60T 13/662; B60T 2270/82; B60T 2270/304; B60T 2270/20; B60T 2270/10; B60T 2220/04
See application file for complete search history.

(56) References Cited

U.S. PATENT DOCUMENTS 6,027,182 A * 2/2000 Nakanishi ............... B60T 7/042
188/356
6,142,581 A * 11/2000 Yamaguchi ............... B60T 7/12
303/113.2
(Continued)

FOREIGN PATENT DOCUMENTS

KR 10-0921395 10/2009
KR 10-2013-0011839 1/2013

*Primary Examiner* — Vishal R Sahni
(74) *Attorney, Agent, or Firm* — Ladas & Parry, LLP

(57) ABSTRACT

An electric brake system and a method for controlling the same are disclosed. The electric brake system includes a hydraulic control device, a sensing unit, and a controller. The hydraulic control device generates hydraulic pressure using a piston operated by an electric signal generated in response to a displacement of a brake pedal. The sensing unit detects driver's braking intention. When an electronic stability control (ESC) of a vehicle operates, the controller calculates a change amount of stroke of the piston needed to output brake pressure corresponding to the driver's braking intention, and acquires the calculated stroke change amount so as to boost pressure of each wheel at a predetermined slope.

20 Claims, 4 Drawing Sheets

(51) Int. Cl.
*B60T 7/04* (2006.01)
*B60T 8/172* (2006.01)
*B60T 8/175* (2006.01)
*B60T 8/1755* (2006.01)
*B60T 8/176* (2006.01)
*B60T 8/48* (2006.01)
*B60T 13/62* (2006.01)
*B60T 13/66* (2006.01)
*B60T 13/74* (2006.01)

(56) References Cited

U.S. PATENT DOCUMENTS

| | | | |
|---|---|---|---|
| 6,189,986 B1 * | 2/2001 | Shimizu | B60T 7/12 303/113.4 |
| 6,312,064 B1 * | 11/2001 | Koike | B60K 31/107 303/116.1 |
| 2005/0251316 A1 * | 11/2005 | Kato | B60T 8/1755 701/70 |
| 2007/0290552 A1 * | 12/2007 | Kito | B60T 8/1755 303/138 |
| 2014/0339889 A1 * | 11/2014 | Mizoguchi | B60T 7/22 303/9.62 |
| 2015/0035352 A1 * | 2/2015 | Fujiki | B60T 7/042 303/15 |

* cited by examiner

ELECTRIC BRAKE SYSTEM AND METHOD FOR CONTROLLING THE SAME

CROSS-REFERENCE TO RELATED APPLICATION

This application is based on and claims priority under 35 U.S.C. § 119 to Korean Patent Application No. 10-2017-0052327, filed on Apr. 24, 2017 in the Korean Intellectual Property Office, the disclosure of which is incorporated by reference in its entirety.

BACKGROUND

1. Field

Embodiments of the present disclosure relate to an electric brake system, and more particularly to an electric brake system for regulating hydraulic pressure to stably stop operation of an anti-lock brake system (ABS), and a method for controlling the same.

2. Description of the Related Art

A brake system for braking of a vehicle is essentially mounted to a vehicle, and various systems have recently been proposed to obtain stronger and more stable braking force.

Examples of brake systems include anti-lock brake systems (ABSs) to prevent slippage of wheels during braking, brake traction control systems (BTCSs) to prevent slippage of driving wheels during sudden unintended acceleration from a stop or upon rapid acceleration of a vehicle, and electronic stability control systems (ESCs) to stably maintain a driving state of vehicles by controlling a brake hydraulic pressure through combination of an anti-lock brake system with a brake traction control system.

Generally, an electronically controlled brake system includes a hydraulic-pressure supply device. Once a driver pushes a brake pedal, the hydraulic-pressure supply device senses displacement of the pedal through a pedal stroke sensor, and receives an electric signal indicating the driver's braking intention from the pedal stroke sensor, such that pressure is supplied to the wheel cylinder.

The hydraulic-pressure supply device is configured to operate a motor in response to foot force applied to a brake pedal, such that brake pressure is generated. In this case, the brake pressure may allow rotational force of the motor to be converted into rectilinear motion and presses a piston, resulting in the occurrence of brake pressure.

Specifically, when the motor generates hydraulic pressure, the electronically controlled brake system may regulate the position of pistons connected to a hydraulic circuit disposed between a master cylinder and wheel pistons, may recognize a relationship between the amounts of fluids (oils) flowing into calipers using the regulated pistons, and may regulate brake pressure using the recognized relationship.

In addition, during ABS, ESC, or TSC control, the electronically controlled brake system may regulate torque of the motor and may acquire a rapid control response by controlling wheel valves.

In this case, when the electronically controlled brake system regulates wheel valves during ABS control, there may occur a large variation in wheel pressure, such that an unexpected error may unavoidably occur between brake pressure requested by a vehicle driver and actual pressure generated in wheels at the end point of the ABS control.

SUMMARY

Therefore, it is an aspect of the present disclosure to provide a technology for reducing not only noise and vibration generated in the end of ABS control, but also driver's sense unfamiliar with ABS braking of a vehicle, and stably finishing the ABS control.

Additional aspects of the invention will be set forth in part in the description which follows and, in part, will be obvious from the description, or may be learned by practice of the invention.

In accordance with an aspect of the present disclosure, an electric brake system includes: a hydraulic control device configured to generate hydraulic pressure using a piston operated by an electric signal generated in response to a displacement of a brake pedal; a sensing unit configured to sense driver's braking intention; and a controller configured to, when an electronic stability control (ESC) of a vehicle operates, calculate a change amount of stroke of the piston needed to output brake pressure corresponding to the driver's braking intention, and acquire the calculated stroke change amount so as to boost pressure of each wheel at a predetermined slope.

The hydraulic control device may include: a master cylinder configured to generate hydraulic pressure corresponding to the displacement of the brake pedal; a hydraulic circuit configured to transfer the hydraulic pressure generated by the master cylinder to at least one wheel; an actuator configured to supply hydraulic pressure needed to drive the hydraulic circuit; and a cut valve disposed between the master cylinder and the hydraulic circuit, and configured to control flow of oil.

The actuator may include: a motor configured to generate power according to an electric signal of the brake pedal; and a hydraulic piston configured to generate displacement based on the generated power.

The sensing unit may further include a pedal stroke sensor configured to sense displacement of the brake pedal.

The controller may control pressure of each wheel by controlling torque of the motor, during the anti-lock brake system (ABS) operation.

When a difference between brake pressure requested by the driver and pressure of at least one wheel is higher than a predetermined threshold value, the controller may calculate the change amount of stroke of the piston in a manner that brake pressure corresponding to the driver's braking intention, and may acquire the calculated stroke change amount so as to boost the pressure of each wheel at a predetermined slope.

The controller may control the position of the hydraulic piston so as to acquire the calculated stroke change amount.

In accordance with another aspect of the present disclosure, a method for controlling an electric brake system that includes a hydraulic control device for generating hydraulic pressure using a piston operated by an electric signal generated in response to a displacement of a brake pedal, includes: sensing driver's braking intention; when an electronic stability control (ESC) of a vehicle operates, calculating a change amount of stroke of the piston needed to output brake pressure corresponding to the driver's braking intention; and acquiring the calculated stroke change amount so as to boost pressure of each wheel at a predetermined slope.

The hydraulic control device may include: a master cylinder configured to generate hydraulic pressure corresponding to the displacement of the brake pedal; a hydraulic circuit configured to transfer the hydraulic pressure generated by the master cylinder to at least one wheel; an actuator configured to supply hydraulic pressure needed to drive the hydraulic circuit; and a cut valve disposed between the master cylinder and the hydraulic circuit, and configured to control flow of oil.

The actuator may include: a motor configured to generate power according to an electric signal of the brake pedal; and a hydraulic piston configured to generate displacement based on the generated power.

The driver's braking intention may be detected through the displacement of the brake pedal.

The method may further include controlling pressure of each wheel by controlling torque of the motor, during the anti-lock brake system (ABS) operation.

When a difference between brake pressure requested by the driver and pressure of at least one wheel is higher than a predetermined threshold value, the method may further include calculating the change amount of stroke of the hydraulic piston.

The acquiring of the calculated stroke change amount to boost pressure of each wheel at the predetermined slope may include controlling the position of the hydraulic piston.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION

Figure 1:
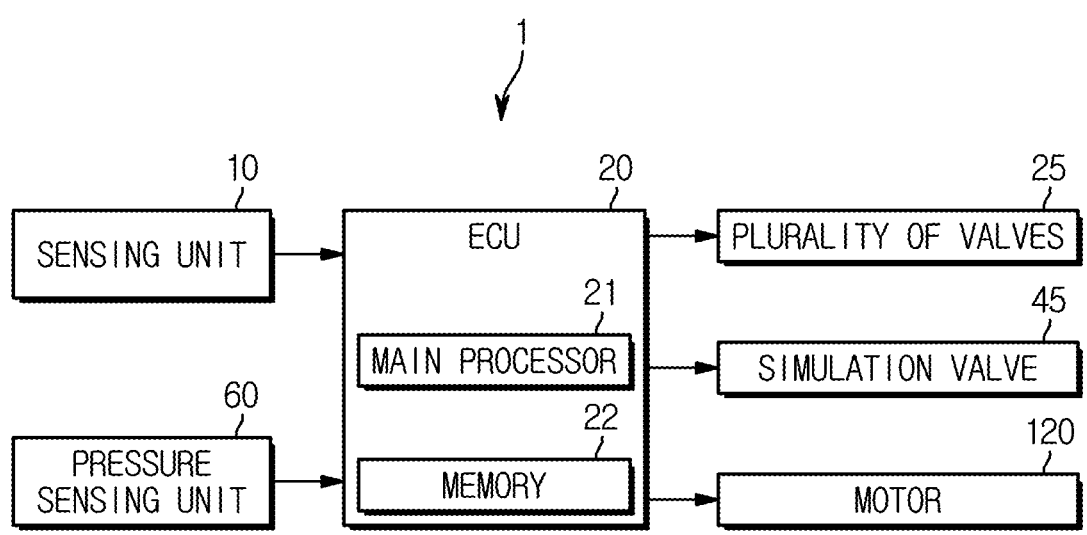
FIG. 1 is a block diagram illustrating an electric brake system of a vehicle according to an embodiment of the present disclosure.

Reference will now be made in detail to the embodiments of the present disclosure, examples of which are illustrated in the accompanying drawings, wherein like reference numerals refer to like elements throughout. The scope or spirit of the present disclosure is not limited to the embodiments and may be realized in various other forms. The embodiments are only provided to more completely illustrate the present disclosure and to enable a person having ordinary skill in the art to fully understand the scope of the present disclosure. In the drawings, sizes and shapes of elements may be exaggerated or reduced for convenience and clarity of description.

Figure 2:
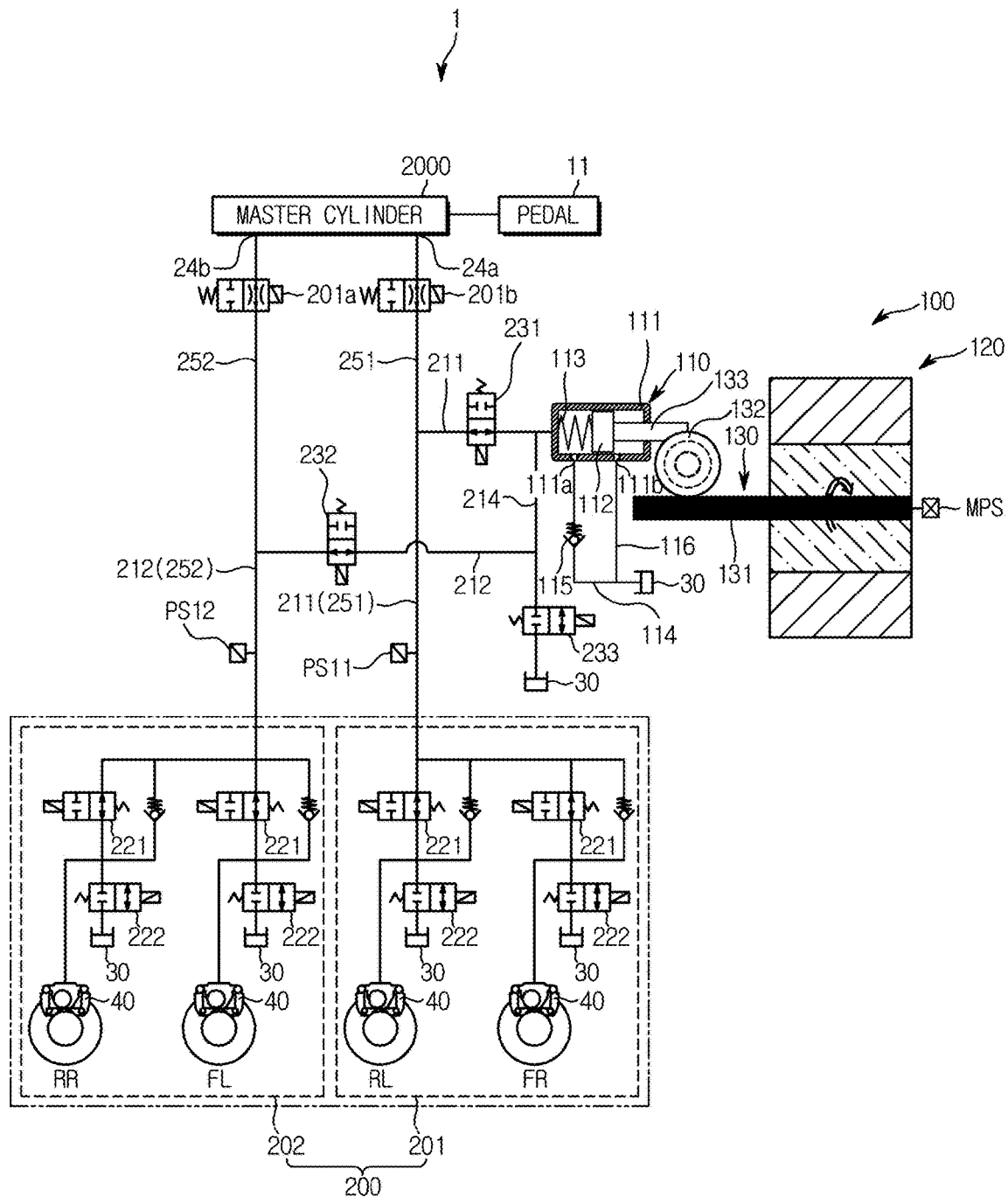
FIG. 2 is a view illustrating a hydraulic circuit controlled by the electric brake system of the vehicle according to an embodiment of the present disclosure.

FIG. 1 is a block diagram illustrating an electric brake system of a vehicle according to an embodiment of the present disclosure. FIG. 2 is a view illustrating a hydraulic circuit controlled by the electric brake system of the vehicle according to the embodiment of the present disclosure.

Referring to FIG. 1, the electric brake system 1 of the vehicle may include a sensing unit 10 to sense the driver's braking intention, a pressure sensing unit 60 to sense hydraulic pressure of a hydraulic device, an electronic control unit (ECU) 20 to perform braking control, a plurality of valves 25, a simulation valve 45, and a motor 120. The plurality of valves 25, the simulation valve 45, and the motor 120 may be driven according to a control signal calculated by the ECU 20.

The sensing unit 10 may include a pedal stroke sensor (not shown).

The pedal stroke sensor may detect the amount of the driver's foot stroke applied to a brake pedal. In more detail, the pedal stroke sensor may convert an output voltage into a stroke indicating how deep the driver depresses the brake pedal, such that the pedal stroke sensor may sense the driver's braking intention and the amount of braking desired by the driver.

The pedal stroke sensor may be configured as a pair of True/False outputs, in a pair of Positive/Negative outputs, or as a single signal output.

The pressure sensing unit 60 may include a plurality of pressure sensors. The pressure sensors may be disposed not only in the master cylinder, the hydraulic cylinder, but also in a hydraulic circuit between chambers of respective wheels (FR, FL, RR, RL). Therefore, pressure values measured by the respective pressure sensors may be transmitted to the ECU 20.

The ECU 20 may provide overall control to the electric brake system 1 of the vehicle according to the embodiment of the present disclosure.

In more detail, the ECU 20 may detect the driver's braking intention and the amount of braking desired by the driver from the sensing unit 10, and may thus calculate brake pressure requested by the driver. The ECU 20 may include a main processor 21 and a memory 22. The main processor 21 may acquire actual brake pressure values of the wheels from wheel pressure values obtained from the pressure sensing unit 60, and may correct a difference in pressure on the basis of the acquired actual brake pressure values. The memory 22 may store various kinds of data therein.

That is, the main processor 21 contained in the ECU 20 may include various constituent elements contained in a hydraulic control device 100 shown in FIG. 2, for example, a master cylinder 2000, a hydraulic circuit 200, an actuator 110, 120 and 130, at least one cut valve 201a and 201b, and wheels (FR, FL, RR, RL) connected to the hydraulic circuit 200.

In more detail, the master cylinder 2000 contained in the hydraulic control device 100 may generate hydraulic pressure. A reservoir for storing oil may be coupled to an upper part of the master cylinder 2000. An input rod 12 may pressurize the master cylinder 2000 according to foot force applied to the brake pedal. The hydraulic pressure generated in the master cylinder 2000 may be transferred to wheel cylinders of the respective wheels (RR, RL, FR, FL), thereby braking the respective wheels (RR, RL, FR, FL).

The master cylinder 2000 may be configured to have at least one chamber, thereby generating hydraulic pressure.

For example, the master cylinder 2000 may include two chambers respectively having a first piston (a) and a second piston (b). As a result, hydraulic pressures may be respectively discharged from the two chambers, such that the resultant hydraulic pressures may be discharged to the hydraulic circuit 200.

Meanwhile, the master cylinder 2000 provided with two chambers may be designed to secure safety in the event of malfunction. For example, the first one of the two chambers is connected to the front right wheel FR and the rear left wheel RL of the vehicle, and the other one of the two chambers is connected to the front left wheel FL and the rear right wheel RR. By configuring the two chambers to be independent of each other, braking of the vehicle remains possible even when one of the two chambers malfunctions.

The hydraulic circuit 200 may include a plurality of valves 25 and a simulation valve 45, and may regulate hydraulic pressure applied to each wheel by opening or closing the valves upon receiving a control signal from the ECU 20.

The cut valve 201 may be disposed between the master cylinder 2000 and the hydraulic circuit 200, and may control flow of hydraulic pressure applied to the hydraulic circuit 200.

The actuator 110, 120 and 130 may include the motor 120, and the motor may pump brake fluid to the respective wheel cylinders, and may supply the brake fluid to the respective wheel cylinders.

The hydraulic control device 100 may operate according to a control signal generated by the main processor 21 included in the ECU 20.

In more detail, the ECU 20 may provide overall control to the electric brake system 1 of the vehicle according to the embodiment of the present disclosure.

The electric brake system 1 may directly control hydraulic pressure applied to each wheel by adjusting torque of the motor 120 during ABS (Anti-lock Brake system) control.

Several reservoirs 30 may be shown in FIG. 2, and the respective reservoirs 30 may be denoted by the same reference number. However, the reservoirs 30 may be implemented as the same or different components. The electric brake system 1 according to the embodiment of the present disclosure may include a hydraulic-pressure supply device 100, a hydraulic circuit 200, a first cut valve 201b, a second cut valve 201a, and an electronic control unit (ECU) 20. The hydraulic-pressure supply device 100 may mechanically operate by receiving an electric signal indicating the driver's braking intention from a pedal 11. The hydraulic circuit 200 may include first and second hydraulic circuits 201 and 202, each of which includes two wheels (two of RR, RL, FR, FL) and controls flow of hydraulic pressure supplied to the wheel cylinder 40 disposed in the two wheels (two of RR RL, FR, FL). The first cut valve 201b may be disposed in a first backup passage 251 configured to interconnect a first hydraulic port 24a and the first hydraulic circuit 201, and may control flow of hydraulic pressure. The second cut valve 201a may be disposed in a second backup passage 252 configured to interconnect a second hydraulic port 24b and the second hydraulic circuit 202, and may control flow of hydraulic pressure. The ECU 20 may control the hydraulic-pressure supply device 100 and valves (201a, 201b, 221, 222, 231, 232, 233) based on hydraulic pressure information and pedal displacement information. The hydraulic-pressure supply device 100 may include a pressure providing unit 110 to provide oil pressure to be supplied to wheel cylinders 40, a motor 120 to produce rotational force according to an electrical signal from a pedal stroke sensor, and a power switching unit 130 to convert rotational motion of the motor 120 into rectilinear motion and to provide the rectilinear motion to the pressure providing unit 110.

The pressure providing unit 110 may include a pressure chamber 111 having a predetermined space therein to store oil supplied thereto, a hydraulic piston 112 provided in the pressure chamber 111, and a hydraulic spring 122 disposed between the hydraulic piston 112 and the pressure chamber 111 to elastically support the hydraulic piston 112.

The pressure chamber 111 may be connected to the reservoir 30 through an oil passage 114, and may receive oil from the reservoir 30 and store the oil therein. The oil passage 114 may be configured to communicate with a first communication hole 111a formed in an inlet of the pressure chamber 111. For example, the first communication hole 111a may be formed in the pressure chamber 111's inlet in which pressure occurs during forward movement of the hydraulic piston 112

In addition, the oil passage 114 may be provided with a check valve 115 to prevent pressure of the pressure chamber 111 from flowing backward. During forward movement of the hydraulic piston 112, the check valve 115 may prevent the oil contained in the pressure chamber 111 from flowing into the reservoir 30 through the oil passage 114. After that, when the hydraulic piston 112 moves back to the original position thereof, the check valve 115 may suction the oil of the reservoir 30, and may allow the suctioned oil to be stored in the inlet of the pressure chamber 111.

When the hydraulic piston 112 moves back to the original position thereof and at the same time absorbs hydraulic pressure contained in the pressure chamber 111, the hydraulic-pressure supply device 100 may prevent occurrence of the case in which the hydraulic pressure contained in the pressure chamber 111 is not released to the atmospheric pressure. For example, the pressure chamber 111 may be provided with a second communication hole 111b, and a connection passage 116 for interconnecting the second communication hole 111b and the oil passage 114 may be disposed between the oil passage 114 and an outlet of the pressure chamber 111. In this case, the second communication hole 111b may be formed at a position corresponding to the initial position (that is, the position of the hydraulic piston 112 on the condition that internal pressure of the pressure chamber 111 is released by the hydraulic piston 112 moving back to the outlet of the pressure chamber 111) of the hydraulic piston 112. Therefore, as the hydraulic piston 112 moves back to the original position thereof, the outlet of the pressure chamber 111 is automatically connected to the reservoir 30 through the connection passage 116, such that pressure may return to the atmospheric pressure.

The motor 120 may produce rotational force according to an output signal of the ECU 20, and may produce rotational force in a forward or backward direction. A rotational angular speed and a rotation angle of the motor 120 may be precisely controlled. The motor 120 is well known to those skilled in the art, and as such a detailed description thereof will herein be omitted for convenience of description.

Meanwhile, the ECU 20 may control the motor 120 and valves included in the electric brake system 1 to be described later.

Driving force of the motor 120 may generate displacement of the hydraulic piston 112 through the power switching unit 130. Hydraulic pressure generated by the hydraulic piston 112 slidably moving within the pressure chamber 111 may be transferred to the wheel cylinders 40 respectively installed at the wheels (RR, RL, FR, FL) through the first and second hydraulic passages 211 and 212.

The power switching unit 130 may convert rotational force into rectilinear movement. For example, the power switching unit 130 may include a worm shaft 131, a worm wheel 132, and a drive shaft 133.

The worm shaft 131 may be integrated with a rotational shaft of the motor 120. At least one worm may be formed at the outer circumference of the worm shaft 131 in a manner that the worm shaft 131 is meshed with the worm wheel 132 so that the worm wheel 132 can rotate. The worm wheel 132 may be meshed with the drive shaft 133 so that the drive shaft 133 performs rectilinear motion. The drive shaft 133 is connected to the piston 111, such that the piston 111 may slidably move within the pressure chamber 111.

In contrast, when foot force is removed from the brake pedal, the ECU 20 may allow the motor 120 to move in an opposite direction, the worm shaft 131 may rotate in the opposite direction. As a result, the worm wheel 132 may also rotate in the opposite direction, and the hydraulic piston 112 connected to the drive shaft 133 may return to the original position thereof. In this case, the hydraulic spring 113 may provide the hydraulic piston 112 with elastic force, such that internal hydraulic pressure of the pressure chamber 111 can be rapidly suctioned through the hydraulic spring 113.

As described above, the hydraulic-pressure supply device 100 may transfer hydraulic pressure to the wheel cylinder 40 according to a rotational direction of rotational force generated by the motor 120 or may suction the hydraulic pressure and transfer the suctioned hydraulic pressure to the reservoir 30.

The hydraulic circuit 200 according to the embodiment of the present disclosure will hereinafter be described in detail.

The hydraulic circuit 200 may include the first hydraulic circuit 201 and the second hydraulic circuit 202, each of which receives hydraulic pressure and controls two wheels. For example, the first hydraulic circuit 201 may control the front right wheel FR and the rear left wheel RL, and the second hydraulic circuit 202 may control the front left wheel FL and the rear right wheel RR. The wheel cylinders 40 may be respectively installed in the wheels (FR, FL, RR, RL), and may receive hydraulic pressure, such that braking of the vehicle is performed.

The hydraulic circuit 200 may receive hydraulic pressure from the hydraulic-pressure supply device 100 not only through the first hydraulic passage 211 for interconnecting the first hydraulic circuit 201 and the hydraulic-pressure supply device 100, but also through the second hydraulic passage 212 connected to the second hydraulic circuit 202. In this case, the second hydraulic passage 212 may be connected to a branch passage 214 branched from the first hydraulic passage 211.

The first and second hydraulic passages 211 and 212 may be connected to each other through the branch passage 214, may receive hydraulic pressure from the hydraulic-pressure supply device 100, and may transfer the received hydraulic pressure to the wheel cylinders 40 of the respective hydraulic circuits 201 and 202. In this case, the respective hydraulic circuits 201 and 202 may include a plurality of inlet valves 221 to control flow of hydraulic pressure.

For example, the first hydraulic circuit 201 may include two inlet valves 221 connected to the first hydraulic passage 211 such that the two inlet valves 221 may respectively control hydraulic pressures applied to two wheel cylinders 40. The second hydraulic circuit 202 may include two inlet valves 221 connected to the second hydraulic passage 212 such that the two inlet valves 221 may respectively control hydraulic pressures applied to the wheel cylinders 40.

The inlet valves 221 may be arranged upstream of the wheel cylinders 40. The inlet valves 221 may be implemented as normally opened (NO) solenoid valves that remain opened in a normal state and then closed upon receiving a closing signal from the ECU 20.

The hydraulic circuit 200 may further include a plurality of outlet valves 222 connected to the reservoir 30 so as to improve performance or throughput when braking is released. The outlet valves 222 may be respectively connected to the wheel cylinders 40 so as to control discharge hydraulic pressure from the wheels (RR, RL, FR, FL). That is, the outlet valves 222 may sense brake pressure of the respective wheels (RR, RL, FR, FL). If decompression braking is needed, the outlet valves 222 may be selectively opened so as to control pressure.

The outlet valves 222 may be implemented as normally closed (NC) solenoid valves that remain closed in a normal state and then opened upon receiving an opening signal from the ECU 20.

The electric brake system 1 according to the embodiment of the present disclosure may include the first switching valve 231 provided in the first hydraulic passage 211 and the second switching valve 232 provided in the second hydraulic passage 212.

The first and second switching valves 231 and 232 may be controlled independent of each other, and may be implemented as normally closed (NC) solenoid valves that remain closed in a normal state and then opened upon receiving an opening signal from the ECU 20. The first and second switching valves 231 and 232 may be selectively opened or closed according to requested pressure, and may control flow of hydraulic pressure applied to the wheel cylinders 40. For example, if it is necessary to supply hydraulic pressure only to the wheel cylinder 40 provided in the first hydraulic circuit 201, only the first switching valve 231 is opened such that hydraulic pressure discharged through the hydraulic-pressure supply device 100 can be transmitted to the first hydraulic circuit 201 other than the second hydraulic circuit 202. The operation structures of the first and second switching valves 231 and 232 will hereinafter be described in detail.

The electric brake system 1 according to the embodiment of the present disclosure may further include a release valve 233. If generated pressure is higher than a target pressure value established according to foot force applied to the brake pedal 10, the release valve 233 may control the generated pressure to follow the target pressure value.

The release valve 233 may be provided in a flow passage that connects the branch passage 214 interconnecting two hydraulic circuits 201 and 202 to the reservoir 30. That is, the release valve 233 may be disposed between the hydraulic-pressure supply device 100 and the first and second switching valves 231 and 232. The release valve 233 may be implemented as a normally closed (NC) solenoid valve that remains closed in a normal state and then opened upon receiving an opening signal from the ECU 20.

The electric brake system 1 according to the embodiment of the present disclosure may further include first and second backup passages 251 and 252. When the electric brake system 1 abnormally operates, the first and second backup passages 251 and 252 are capable of directly supplying the oil discharged from the master cylinder 2000 to the wheel cylinders 40.

The first cut valve 201*b* for controlling flow of the oil may be provided in the first backup passage 251. The second cut valve 201*a* for controlling flow of the oil may be provided in the second backup passage 252. In addition, the first backup passage 251 may connect the first hydraulic port 24*a* to the first hydraulic circuit 201, and the second backup passage 252 may connect the second hydraulic port 25*b* to the second hydraulic circuit 202.

The first and second cut valves 201*b* and 201*a* may be implemented as a normally opened (NO) solenoid valves that remain opened in a normal state and then closed upon receiving a closing signal from the ECU 20. The operation structures of the first and second cut valves 201b and 201a will hereinafter be described.

In the meantime, the reference number PS11 may refer to a first hydraulic passage pressure sensor to sense hydraulic pressure of the first hydraulic circuit 201, the reference number PS12 may refer to a second hydraulic passage pressure sensor to sense hydraulic pressure of the second hydraulic circuit 202, the reference number PS2 may refer to a backup passage pressure sensor to measure oil pressure of the master cylinder 2000, and the reference number MPS may refer to a rotation angle of the motor 50 or a current of the motor 120.

The electric brake system 1 according to the embodiment of the present disclosure may regulate the position of a hydraulic piston 112 using the motor 120, and may regulate the amount of fluid (oil) using a prescribed consumed-fluid-amount curve indicating the relationship between brake pressure generated in the caliper and the amount of fluid (oil) flowing into the caliper, thereby controlling brake pressure.

In this case, the hydraulic piston 112 may be disposed in the actuator 110, 120 and 130.

Figure 3:
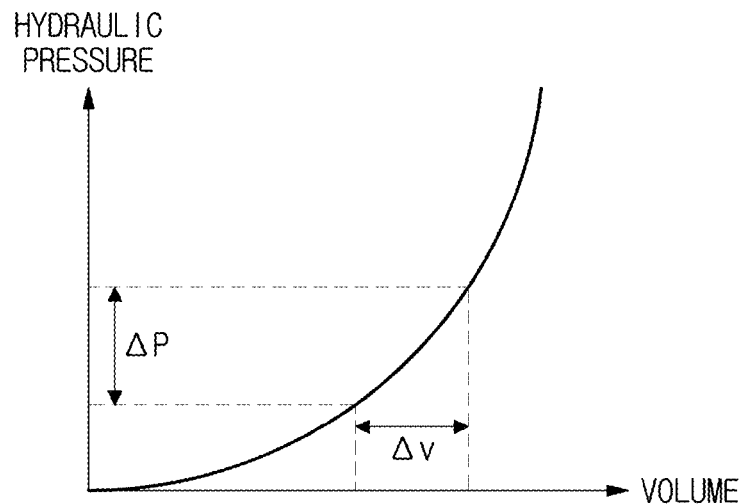
FIG. 3 is a graph illustrating characteristics of the amount of fluid consumed in the electric brake system according to an embodiment of the present disclosure.

That is, driving force of the motor 120 may generate hydraulic displacement of the hydraulic piston 112, and hydraulic pressure generated during slidable movement of the hydraulic piston 112 may be transferred to the wheel cylinders 40. FIG. 3 is a graph illustrating characteristics of the amount of fluid consumed in the electric brake system 1 according to an embodiment of the present disclosure.

Based on the consumed-fluid-amount curve, a change amount (ΔP) of hydraulic pressure generated according to a volume change amount (ΔV) of the fluid flowing into the caliper may be calculated such that brake pressure generated in the caliper may also be calculated.

In this case, the volume change amount (ΔV) of the fluid may be calculated as the product of the moving distance of stroke and the piston area.

Specifically, the consumed-fluid-amount curve may use a function that is prescribed to calculate the change amount (ΔP) of hydraulic pressure generated according to the volume change amount (ΔV) of fluid flowing into the caliper.

That is, as shown in FIG. 3, the ECU 20 may calculate the amount of fluid appropriate for brake pressure requested for each wheel according to a characteristic curve of the amount of fluid consumed in the vehicle, and may control the hydraulic control device 100 in a manner that brake pressure is generated at each wheel.

During ABS control, the electric brake system 1 according to the embodiment of the present disclosure may directly control hydraulic pressure applied to each wheel through torque control of the motor 120, and may control the opening or closing of the plurality of valves 25 included in the hydraulic circuit 200, such that the respective wheels can be rapidly controlled.

However, during ABS(Anti-lock Brake system) control, the ECU 20 may directly control hydraulic pressure applied to the respective wheels by regulating torque of the motor 120. Thereafter, when the ECU 20 controls brake pressure of the respective wheels by regulating the position of the piston (not shown) according to the consumed-fluid-amount characteristic curve, there may arise a difference between the brake pressure requested by the driver and the brake pressure of each wheel, resulting in the driver's sense unfamiliar with ABS braking of the vehicle.

Figure 4:
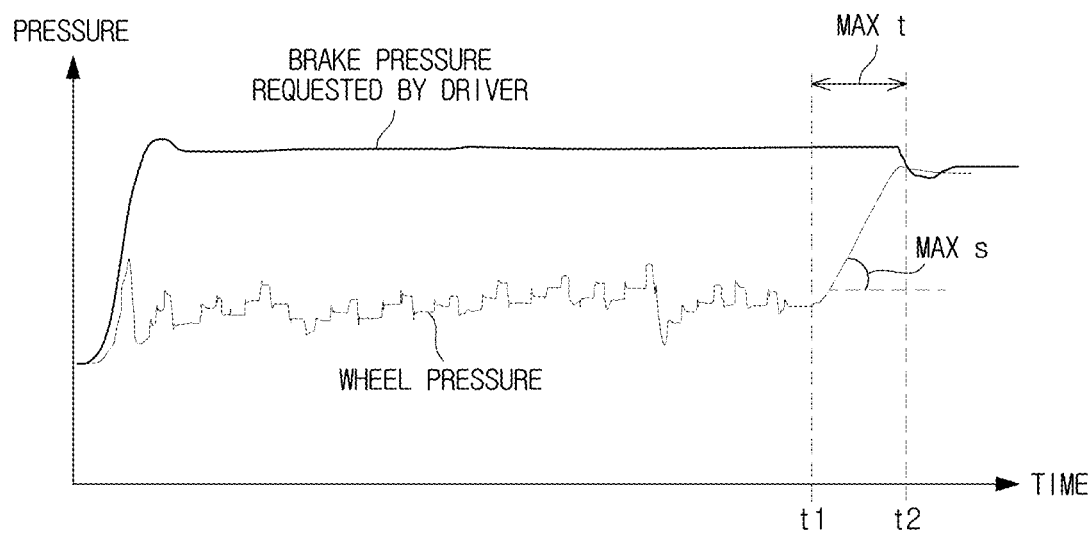
FIG. 4 is a graph illustrating operations of the electric brake system of the vehicle according to an embodiment of the present disclosure.

FIG. 4 is a graph illustrating a method for controlling wheel pressure of the electric brake system of the vehicle according to lapse of time.

Referring to FIG. 4, during ABS control, the electric brake system may directly control hydraulic pressure applied to each wheel through torque control of the motor 120, and may control the opening or closing of the plurality of valves 25 included in the hydraulic circuit 200, thereby rapidly controlling the respective wheels.

For example, the electric brake system may confirm the brake pressure requested by the driver through pedal foot force detected through the pedal stroke sensor contained in the sensing unit 10, when the ABS is turned on before reaching a predetermined time "t1[sec]", and may prevent slippage of each wheel through torque control of the motor 120.

Prior to ABS completion after lapse of the predetermined time "t1[sec]", when a difference between the brake pressure requested by the driver and the pressure 42 of each wheel is higher than a predetermined threshold value, the electric brake system may control the position of a chamber piston in a manner that hydraulic pressure needed for each wheel can be generated based on the consumed-fluid-amount characteristic curve.

In more detail, the pressure curve is gradually increased in the range from t1 [sec] to t2[sec], such that the electric brake system may control a difference between the brake pressure requested by the driver and the pressure of each wheel to disappear at the time t2[sec].

In detail, the ECU 20 may increase wheel pressure using a pattern needed to reduce a difference between the brake pressure requested by the driver and the pressure of each wheel. In this case, the input increase pattern may be decided in the range of a maximum slope (Max s) and a maximum time (Max t).

Therefore, when the difference between the brake pressure requested by the driver and the wheel pressure disappears, the ECU 20 may finish ABS control through torque control of the motor 120, may calculate the amount of fluid according to the consumed-fluid-amount characteristic curve, and may control brake pressure of the respective wheels.

The memory 22 may include a volatile memory, such as a Static Random Access memory (SRAM) or Dynamic Random Access Memory (DRAM), or may include a non-volatile memory, such as a Read Only Memory (ROM), an Erasable Programmable Read Only Memory (EPROM), or an Electrically Erasable Programmable Read Only Memory (EEPROM).

The non-volatile memory may semi-permanently store a control program and control data for controlling the electric brake system 1 therein. The volatile memory may retrieve the control program and control data from the non-volatile memory, may temporarily store the retrieved control program and control data, and may temporarily store various kinds of sensor information and various kinds of control signals generated from the main processor.

The electric brake system 1 according to the embodiment of the present disclosure has been disclosed as described above.

Figure 5:
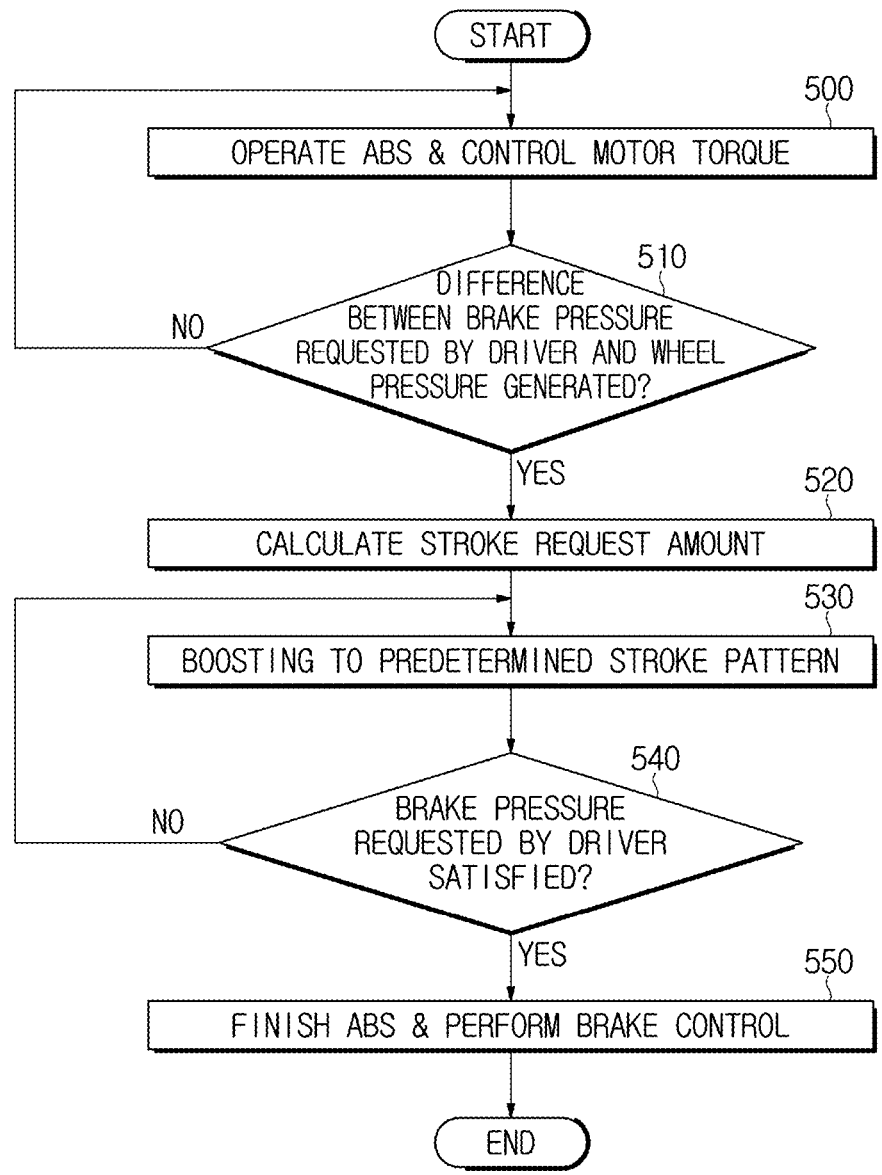
FIG. 5 is a flowchart illustrating a method for controlling an electric brake system of a vehicle according to an embodiment of the present disclosure.

FIG. 5 is a flowchart illustrating a method for controlling the electric brake system 1 according to an embodiment of the present disclosure.

Referring to FIG. 5, if slippage may occur during brake control (Yes in S30) during brake control, the ECU 20 may operate the ABS, and may control torque of the motor contained in the actuator 110, 120 and 130 (500).

Thereafter, if there arises a difference between the brake pressure requested by the driver and each wheel pressure through seamless torque control of the motor (Yes in 510), the electric brake system may calculate the amount of stroke requested to obtain wheel pressure corresponding to the brake pressure requested by the driver (520).

In more detail, in order to calculate the amount of requested stroke, the ECU 20 may calculate the change amount (ΔP) of hydraulic pressure generated according to the volume change amount (ΔV) of the fluid flowing into the caliper on the basis of the consumed-fluid-amount curve, and may thus calculate the amount of stroke needed to acquire the volume change amount of the fluid.

Thereafter, the electric brake system may boost the hydraulic pressure to a stroke pattern established in the ECU 20 by the calculated amount of stroke (530). In this case, the stroke pattern may increase pressure at a predetermined slope, and may be changed in the range from a small slope to a large slope, such that the stroke pattern may be configured in various ways according to the prescribed stroke pattern. However, the ECU 20 may determine the pressure increasing pattern within the range from the maximum slope (Max s) and the maximum time (Max t). Herein, the pressure increasing pattern may refer to a stroke pattern allocated to reduce a difference between the brake pressure requested by the driver and each wheel pressure.

In this case, the ECU 20 may control the position of the chamber piston (not shown), and may boost pressure of each wheel in a manner that the brake pressure requested by the driver can be satisfied.

If the brake pressure requested by the driver is satisfied (Yes in 540), the ECU 20 may finish ABS control through torque control of the motor 120, may calculate the amount of fluid according to the consumed-fluid-amount characteristic curve, and may control the brake pressure of each wheel (550).

As is apparent from the above description, the electric brake system according to the embodiment of the present disclosure may reduce not only noise and vibration generated in the end of ABS control, but also driver's sense unfamiliar with ABS braking of a vehicle, and may stably finish the ABS control.

Although a few embodiments of the present disclosure have been shown and described, it would be appreciated by those skilled in the art that changes may be made in these embodiments without departing from the principles and spirit of the invention, the scope of which is defined in the claims and their equivalents.

What is claimed is:

1. An electric brake system comprising:
   a master cylinder configured to generate hydraulic pressure corresponding to a displacement of a brake pedal;
   a hydraulic circuit configured to transfer the hydraulic pressure generated by the master cylinder to at least one wheel;
   an actuator connected to a passage connecting between the master cylinder and the hydraulic circuit and configured to generate hydraulic pressure using a piston operated by an electric signal generated in response to the displacement of the brake pedal, the actuator comprising a motor configured to drive the piston;
   a sensing unit configured to sense driver's braking intention; and
   a controller configured to calculate a change amount of stroke of the piston of the actuator, connected to a passage connecting between the master cylinder and the hydraulic circuit, needed to output brake pressure corresponding to the driver's braking intention, and control the motor of the actuator to change a torque generated by the motor of the actuator in response to the calculated change amount of the stroke of the piston of the actuator so as to boost pressure of each wheel at a predetermined slope so that the torque generated by the motor of the actuator reduces the difference between the brake pressure corresponding to the driver's braking intention and the pressure of each wheel.

2. The electric brake system according to claim 1, further comprising
   a cut valve disposed between the master cylinder and the hydraulic circuit, and configured to control flow of oil.

3. The electric brake system according to claim 2, wherein the actuator includes:
   the motor configured to generate power according to the electric signal of the brake pedal; and
   the piston configured to generate displacement based on the generated power.

4. The electric brake system according to claim 3, wherein the sensing unit further includes:
   a pedal stroke sensor configured to sense displacement of the brake pedal.

5. The electric brake system according to claim 4, wherein:
   the controller, in response to operation of an electronic stability control (ESC) of a vehicle, calculates the change amount of stroke of the piston of the actuator needed to output the brake pressure corresponding to the driver's braking intention, and
   the operation of electronic stability control (ESC) of the vehicle includes: operating an anti-lock brake system (ABS), a traction control system (TCS) or an electronically stability control (ESC) system.

6. The electric brake system according to claim 4, wherein the controller, in response to operation of an electronic stability control (ESC) of a vehicle, calculates the change amount of stroke of the piston of the actuator needed to output the brake pressure corresponding to the driver's braking intention, and controls pressure of each wheel by controlling torque of the motor, during the anti-lock brake system (ABS) operation.

7. The electric brake system according to claim 1, wherein:
   the controller, when a difference between brake pressure requested by the driver and pressure of at least one wheel is higher than a predetermined threshold value, calculates the change amount of stroke of the piston in a manner that brake pressure corresponding to the driver's braking intention, and acquires the calculated stroke change amount so as to boost the pressure of each wheel at the predetermined slope.

8. The electric brake system according to claim 7, wherein the controller controls the position of the piston so as to acquire the calculated stroke change amount.

9. The electric brake system according to claim 1, wherein:
   the controller is configured to change the predetermined slope within a range that does not exceed a maximum slope (Max Slope) and a maximum operation time (Max Time) to boost the pressure of each wheel based on the changed predetermined slope.

10. The electric brake system according to claim 1, further comprising a switching valve positioned between the actuator and the passage which connects between the master cylinder and the hydraulic circuit.

11. The electric brake system according to claim 10, wherein the switching valve is a normally closed solenoid valve.

12. A method for controlling an electric brake system that includes a master cylinder configured to generate hydraulic pressure corresponding to a displacement of a brake pedal, a hydraulic circuit configured to transfer the hydraulic pressure generated by the master cylinder to at least one wheel, an actuator generating hydraulic pressure using a piston operated by a motor in response to an electric signal generated in response to the displacement of the brake pedal, the method comprising:

sensing driver's braking intention; and when an electronic stability control (ESC) of a vehicle operates, calculating a change amount of stroke of the piston of the actuator, connected to a passage connecting between the master cylinder and the hydraulic circuit, needed to output brake pressure corresponding to the driver's braking intention, and controlling the motor of the actuator to change a torque generated by the motor of the actuator in response to the calculated change amount of the stroke of the piston of the actuator so as to boost pressure of each wheel at a predetermined slope so that the torque generated by the motor of the actuator reduces difference between the brake pressure corresponding to the driver's braking intention and the pressure of each wheel.

13. The method according to claim 12, wherein the brake system includes:

a cut valve disposed between the master cylinder and the hydraulic circuit, and configured to control flow of oil.

14. The method according to claim 12, wherein the actuator includes:

the motor configured to generate power according to an electric signal of the brake pedal; and the piston configured to generate displacement based on the generated power.

15. The method according to claim 14, wherein the driver's braking intention is detected through the displacement of the brake pedal.

16. The method according to claim 15, wherein the operation of electronic stability control (ESC) of the vehicle includes:

operating an anti-lock brake system (ABS), a traction control system (TCS) or an electronically stability control (ESC) system.

17. The method according to claim 16, further comprising:

controlling pressure of each wheel by controlling torque of the motor, during the anti-lock brake system (ABS) operation.

18. The method according to claim 17, further comprising:

when a difference between brake pressure requested by the driver and pressure of at least one wheel is higher than a predetermined threshold value, calculating the change amount of stroke of the piston.

19. The method according to claim 18, wherein the acquiring of the calculated stroke change amount to boost pressure of each wheel at the predetermined slope includes:

controlling the position of the piston.

20. The method according to claim 12, wherein the acquiring of the calculated stroke change amount to boost pressure of each wheel at the predetermined slope includes:

changing the predetermined slope within a range that does not exceed a maximum slope (Max Slope) and a maximum operation time (Max Time); and boosting the pressure of each wheel based on the changed predetermined slope.

* * * * *